(12) United States Patent
Natarahjan et al.

(10) Patent No.: US 7,848,363 B2
(45) Date of Patent: Dec. 7, 2010

(54) SYSTEM AND METHOD FOR RECEIVING CALL SIGNALS IN A COMMUNICATION SYSTEM

(75) Inventors: Harish Natarahjan, Streamwood, IL (US); Gregory A. Feeney, Chicago, IL (US); Kevin L. Good, Maple Park, IL (US); Gary P. Hunsberger, Schaumburg, IL (US); Daniel J. McDonald, Cary, IL (US)

(73) Assignee: Motorola, Inc., Schaumburg, IL (US)

( * ) Notice: Subject to any disclaimer, the term of this patent is extended or adjusted under 35 U.S.C. 154(b) by 85 days.

(21) Appl. No.: 12/121,111

(22) Filed: May 15, 2008

(65) Prior Publication Data

US 2009/0285243 A1 Nov. 19, 2009

(51) Int. Cl.
*H04W 4/16* (2009.01)
*H04L 29/02* (2006.01)

(52) U.S. Cl. .................................. 370/513; 375/366
(58) Field of Classification Search .................. None
See application file for complete search history.

(56) References Cited

U.S. PATENT DOCUMENTS

| 5,799,050 A | * | 8/1998 | Morita | ........................ 375/368 |
| 6,424,673 B1 | | 7/2002 | Chen | |
| 6,516,199 B1 | * | 2/2003 | Soderkvist et al. | .......... 455/502 |
| 7,224,751 B2 | | 5/2007 | Fulli | |
| 2003/0210756 A1 | * | 11/2003 | Ito | .............................. 375/354 |

FOREIGN PATENT DOCUMENTS

| JP | 2000-151551 A | 5/2000 |
| KR | 10-2002-00777986 A | 10/2002 |

OTHER PUBLICATIONS

PCT Search Report Dated Nov. 26, 2009.

* cited by examiner

*Primary Examiner*—Huy D Vu
*Assistant Examiner*—Benjamin Lamont
(74) *Attorney, Agent, or Firm*—Terri S Hughes; Valerie M. Davis

(57) ABSTRACT

A system and method for dynamically altering detection criterion value at a receiving device based on the portion of a call signal being received. A receiving device is configured to extract a first call signal portion from the call signal, and compare the first call signal portion to a plurality of call information portions, wherein each call information portion has a detection criterion value. If the first call signal portion matches one of the call information portions, the receiving device adjusts the detection criterion value for at least one of the plurality of call information portions, extracts a second call signal portion from the call signal, and compares the second call signal portion to the plurality of call information portions.

18 Claims, 3 Drawing Sheets

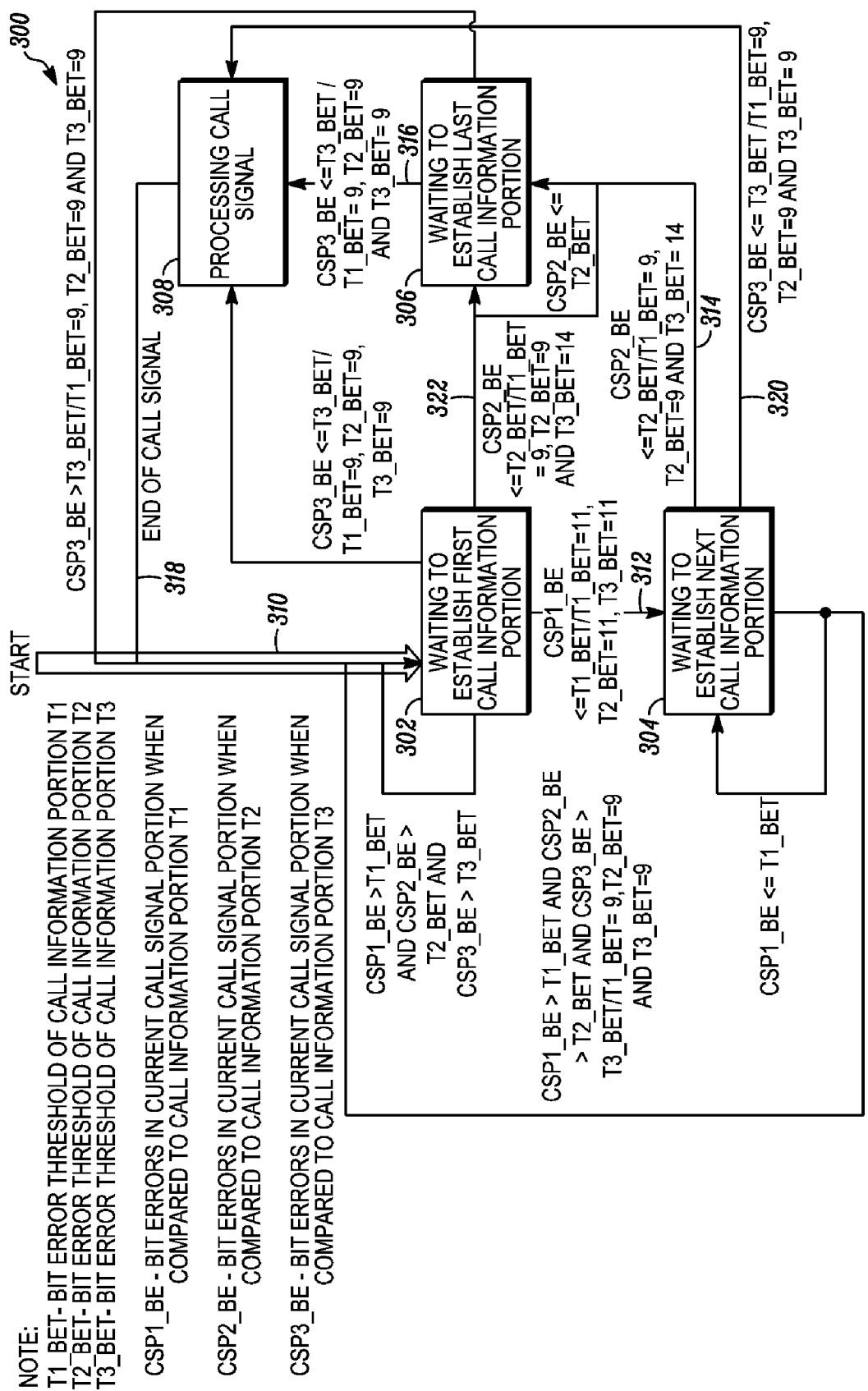

SYSTEM AND METHOD FOR RECEIVING CALL SIGNALS IN A COMMUNICATION SYSTEM

TECHNICAL FIELD OF THE DISCLOSURE

This disclosure relates generally to communication systems, and more particularly, to a system and method for receiving call signals in a communication system.

BACKGROUND OF THE DISCLOSURE

Communication systems typically include a plurality of communication devices, such as mobile or portable radio devices, that are geographically distributed among various base sites, and wirelessly communicate with the base sites and each other. To identify the presence of an incoming call from another communication device or a base site, communication devices are generally configured to detect the presence of one or more criteria, such as a synchronization signal. The communication device will not begin processing the call until such a criteria is received.

For example, in currently proposed standards for Association of Public-Safety Communication Officials (APCO) Project 25 Phase 2 Time Division Multiple Access (TDMA) systems, voice synchronization signals are transmitted once every 360 ms. If the initial voice synchronization signal in the call is not detected, 360 ms of voice information is lost, and voice information continues to be truncated until a voice synchronization signal is detected.

In the past, various system implementations have attempted to utilize fixed threshold levels for detection of the voice synchronization signal based on probabilities for detection and falsing. However, such fixed threshold levels result in various drawbacks depending on the selected level. For instance, while setting a lower threshold for detection of the voice synchronization signal may increase the probability of the receiving device detecting the voice synchronization signal, the lower threshold, however, may also increase the probability of the receiving device detecting and locking onto a false synchronization signal, thus decreasing the probability of the receiving device detecting the loss of the signal during the synchronization process. Similarly, while setting a higher threshold may decrease the probability of the receiving device detecting a false synchronization signal and may increase the probability of the receiving device detecting the loss of the signal during the synchronization process, the higher threshold, however, may also decrease the probability of the receiving device detecting the voice synchronization signal.

BRIEF DESCRIPTION OF THE FIGURES

Various embodiments of the disclosure are now described, by way of example only, with reference to the accompanying figures.

FIG. 3 illustrates an example of a state machine of a receiving device in accordance with the present disclosure.

Figure 1:
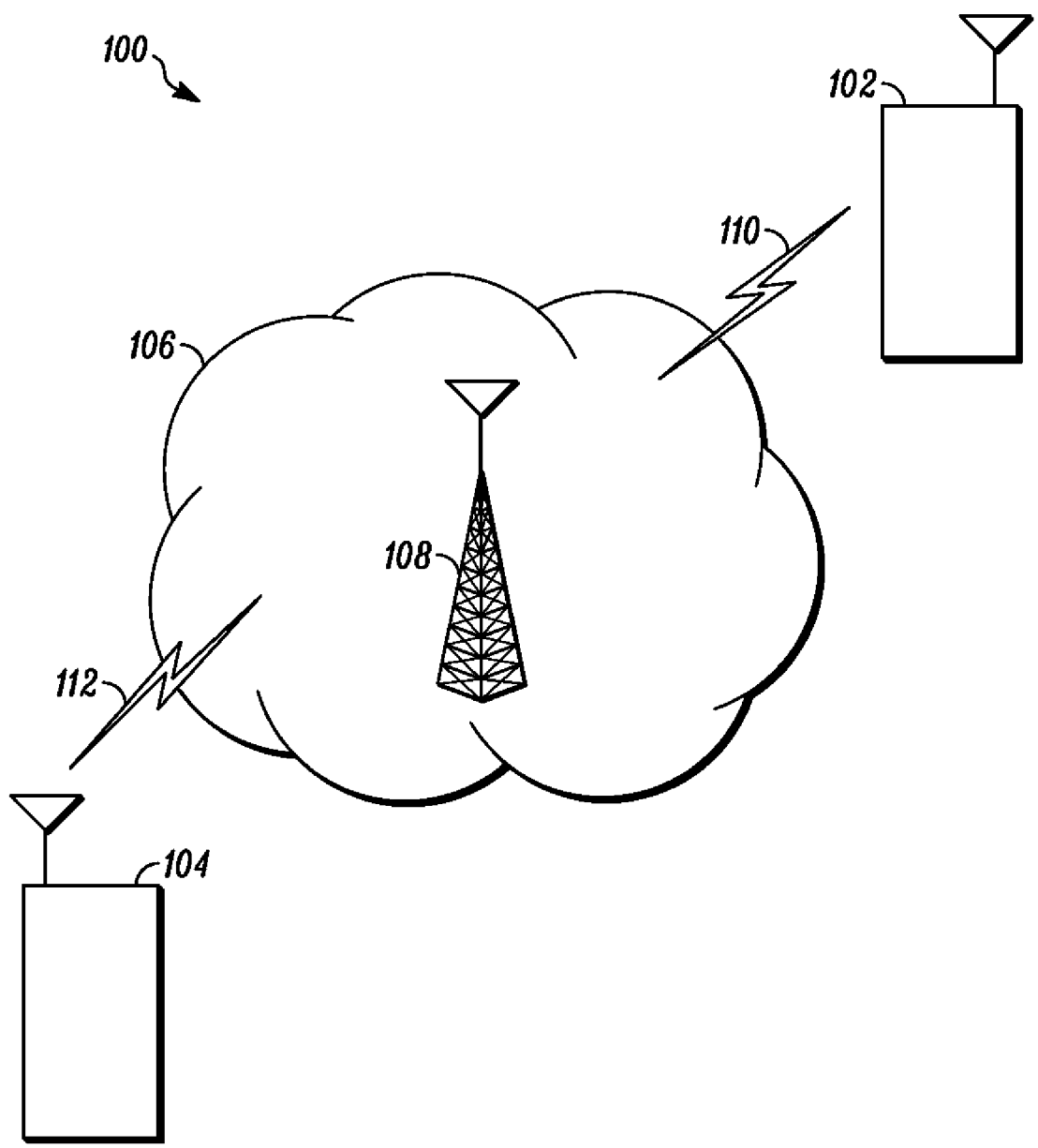
FIG. 1 illustrates an embodiment of a communication system in accordance with the present disclosure.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help improve the understanding of various embodiments of the present disclosure. Also, common but well-understood elements that are useful or necessary in a commercially feasible embodiment are not often depicted in order to facilitate a less obstructed view of these various embodiments of the present disclosure. It will be further appreciated that certain actions and/or steps may be described or depicted in a particular order of occurrence while those skilled in the art will understand that such specificity with respect to sequence is not actually required. It will also be understood that the terms and expressions used herein are to be defined with respect to their corresponding respective areas of inquiry and study except where specific meaning have otherwise been set forth herein.

DETAILED DESCRIPTION OF THE DISCLOSURE

The present disclosure provides a system and method for dynamically altering the detection criterion (or criteria) value/level, if necessary, in a receiving device based on the portion of a call signal (referred to as "call signal portion") being received. For ease of explanation, the present disclosure will refer to a detection criterion value; a person of ordinary skill in the art, however, will easily recognize that a single detection criterion value or two or more detection criteria values are within the spirit, scope and coverage of the present disclosure. Thus, in particular, the receiving device is designed to operate based on the a priori knowledge of an incoming call information portion sequence. A call information portion is a segment of information within the call signal that allows the call signal portion to be distinctively recognized. The number of unique call information portions is governed by the specific protocol used for wireless communication. The receiving device initially assigns a detection criterion value for each unique call information portion in the sequence. The detection criterion value may be one or more combinations of a matched filter, recovered bit comparison, voltage thresholds, or other detection methods well known in the art. When processing a call signal, the call signal portion is compared to the detection criterion value for each of the possible unique call information portions. If the call signal portion matches the detection criterion value of any of the call information portions, the detection criterion value for each call information portion is adjusted, if necessary, based on the knowledge of what sequences of call signal portions can be expected to follow the currently matched call signal portion. The next call signal portion within the call signal is then compared against the adjusted call information detection criterion value. If the next call signal portion matches the detection criterion value of the expected next call information portions, the call information detection criterion value is adjusted again, if necessary. This process is repeated until a call signal portion matches the detection criterion value of the last call information portion in the sequence. If, during this repetitive process, a call signal portion does not match any of the detection criteria, the call signal is discarded and the detection criterion value for all the call information portions in the sequence is reassigned to the initial values.

Let us now discuss the present disclosure in greater detail by referring to the figures below. FIG. 1 illustrates an exemplary wireless communication system 100 that may be used for implementing the present disclosure. The wireless communication system 100 comprises communication devices 102 and 104, which may be, for example, a portable or mobile radio, a personal digital assistant, a cellular telephone, a video terminal, a portable computer with a wireless modem, or any other wireless device. For purposes of the following discussions, the communication devices will be referred to as "radios", but they are also referred to in the art as mobile stations, mobile equipment, handsets, subscribers, etc.

In this exemplary embodiment, radios 102 and 104 communicate over a radio access network 106. Of course, those of ordinary skill in the art will realize that any type of network is within the scope of the teachings herein. Thus, the radio access network 106 may comprise infrastructure such as, but not limited to, base stations (BS) (with a single BS 108 shown for clarity), BS controllers (not shown), network elements (such as, a mobile switching center, home location register, visitor location register, etc.), and the like, to facilitate the communications between radios having access to the radio access network 106.

For example, radio 102 and radio 104 may communicate with each other by radio 102 establishing a wireless link or radio connection 110 with BS 108 over an available radio frequency (RF) channel, and radio 104 establishing a wireless link or radio connection 112 with BS 108 over an available RF channel. As is well understood in the art, BS 108 generally comprises one or more repeater devices that can receive a signal from radio 102 over link 110 and re-transmit the signal to radio 104 over link 112, or can receive a signal from radio 104 over link 112 and re-transmit the signal to radio 102 over link 110. For ease of illustration, only two radios and one BS are shown. However, those skilled in the art will realize that, in a typical system, a much larger number of radios are supported by a radio network, which has many more BSs than is shown in FIG. 1. Moreover, although in this embodiment communication between radios 102 and 104 are illustrated as being facilitated by BS 108, radios 102 and 104 may communicate using a direct mode of operation without a BS. The teachings herein are equally applicable to direct mode operation between two radios.

Since network 106 is a wireless network, meaning that it supports a wireless or air interface protocol for signal transmission, both of the radios 102 and 104, and BS 108, comprise transceivers that include a transmitter and a receiver for transmitting and receiving RF signals, respectively. Radios 102 and 104, and BS 108, further comprise one or more processing devices (such as microprocessors, digital signal processors, customized processors, field programmable gate arrays (FPGAs), unique stored program instructions (including both software and firmware), state machines, etc.) and typically some type of conventional memory element for performing (among other functionality) the air interface protocol and channel access scheme supported by network 106. Using these protocols, radios 102 and 104 can generate RF signals containing one or more data messages comprising a plurality of fields for organizing the continuous bits of information and/or signaling for transmission to another radio.

Figure 2:
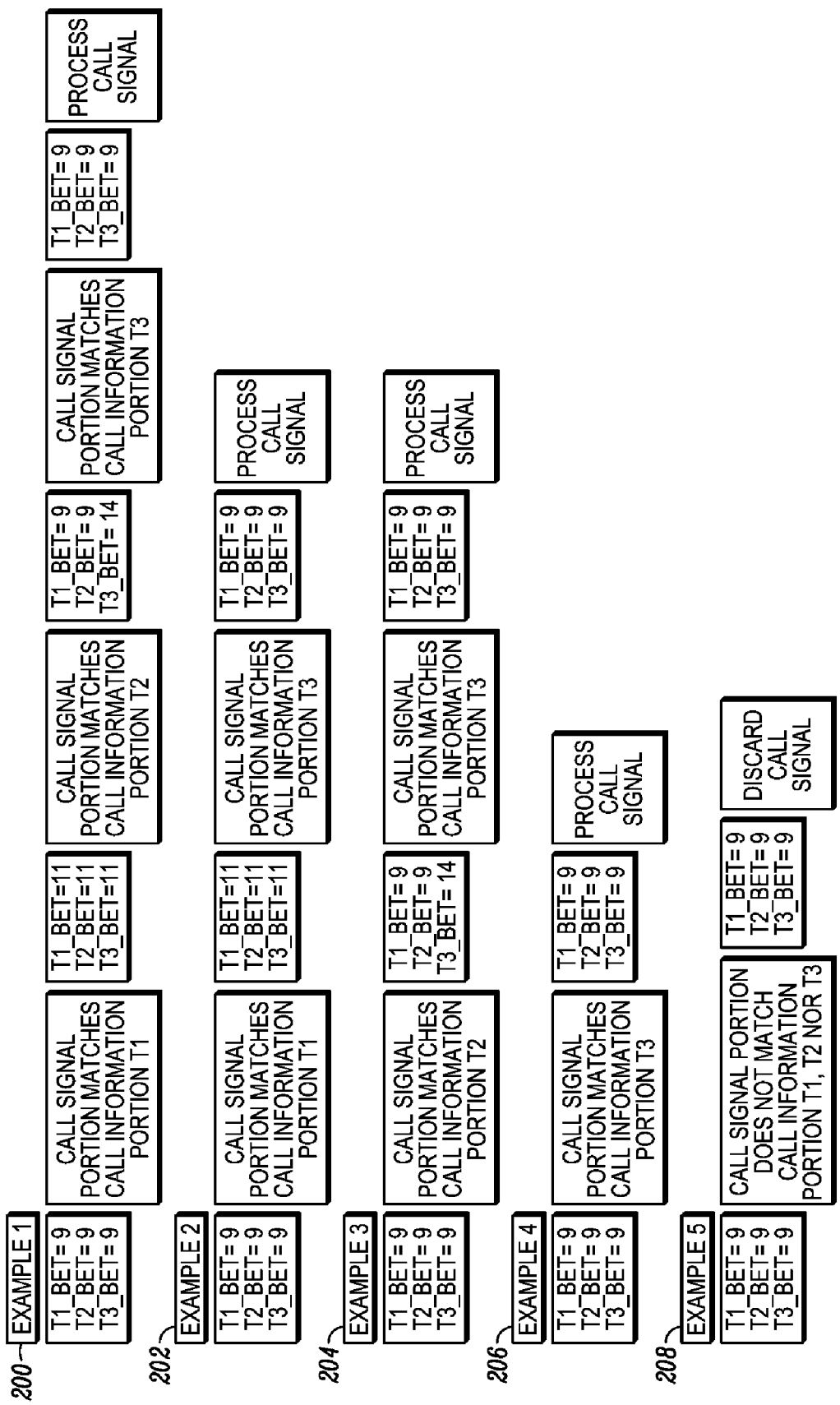
FIG. 2 illustrates examples of possible call signal portion sequences in accordance with the present disclosure.

Of course, while one embodiment of a communication system 100 is described with regards to FIG. 1, those skilled in the art will recognize and appreciate that the specifics of this illustrative example are not specifics of the disclosure itself and that the teachings set forth herein are applicable in a variety of alternative settings. For example, since the teachings described do not depend on the type of air interface protocol or channel access scheme used (e.g., TDMA, Code Division Multiple Access (CDMA), Frequency Division Multiple Access (FDMA), and the like), the teachings can be applied to any type of air interface protocol and channel access scheme. The teachings herein can also be applied with any system and with any protocol utilizing wireline links. As such, other alternative implementations using different types of wireline or wireless protocols and channel access schemes are contemplated and are within the scope of the various teachings described FIGS. 2 and 3 illustrate examples of a protocol for transmitting call signals in the system of FIG. 1. Let us make some general assumptions that will be applicable to each of the following examples. In these examples, T1, T2 and T3 are the three unique call information portions being considered. For purposes of brevity only, let us assume that T1 is a link control header, T2 is an encryption synchronization burst, and T3 is a voice synchronization burst. It should be noted that call information portion T3 is considered as the last call information portion in the sequence for these examples. T1_BET, T2_BET and T3_BET are the detection criterion value, in these examples, is a bit error threshold, used to establish each call information portion. CSP1_BE, CSP2_BE and CSP3_BE are the number of bit errors when a call signal portion is compared to call information portions T1, T2 and T3, respectively. In general, a call signal portion passes the detection criterion value if either (a) CSP1_BE is less than or equal to T1_BET; (b) CSP2_BE is less than or equal to T2_BET; or (c) CSP3_BE is less than or equal to T3_BET. It is apparent to skilled artisans in this field that in typical systems, the unique call information portions, and their respective detection criterion value, are selected in such a way that the probability that a given call signal portion matches only one call information portion is maximized. In a rare occurrence when the call signal portion matches two or more call information portions, the closest match is chosen (in these examples, the call information portion that had the least number of bit errors when compared to the call signal portion is chosen).

Moreover, the initial state for the state machine in FIG. 3 is 302. In initial state 502, T1_BET, T2_BET and T3_BET are set to a pre-determined value (9, in this example). The state machine is ready to process the first call signal portion from the call signal at state 302.

Let us now describe a first example 200 in detail in view of the above general assumptions. In the initial state 302, when a call signal is received (at 310), a first call signal portion is extracted and compared to each of the unique call information portions: T1, T2 and T3. The number of errors CSP1_BE, CSP2_BE and CSP3_BE are derived by comparing the first call signal portion to T1, T2 and T3, respectively. CSP1_BE, CSP2_BE and CSP3_BE are then compared to the detection criterion value, in this example, the bit error threshold: T1_BET, T2_BET and T3_BET, respectively.

In this first example 200, CSP1_BE is less than or equal to T1_BET, the first call signal portion is established as call information portion T1, and the state machine transitions to state 304 (at 312). In this first example, during the transition between state 302 and state 304 (at 312), the detection criterion value for each of the unique call information portions is adjusted as follows: T1_BET is set to 11, T2_BET is set to 11 and T3_BET is set to 11. Adjusting the detection criterion value for each of the unique call information portions allow more errors in the next call signal portion based on the knowledge that one call information portion in the sequence has been successfully established (in this example, T1). It is important to note that although the detection criterion value for all three unique call information portions were adjusted in this example, only the detection criterion value for a subset of the unique call information portions may be adjusted for greater optimization.

In state 304, a second call signal portion is extracted from the call signal and compared to each of the unique call information portions: T1, T2 and T3. The number of errors CSP1_BE, CSP2_BE and CSP3_BE are derived by comparing the second call signal portion to T1, T2 and T3, respectively. CSP1_BE, CSP2_BE and CSP3_BE are then compared to the detection criterion value: T1_BET, T2_BET and T3_BET, respectively.

In the first example 200, while in state 304, CSP2_BE is less than or equal to T2_BET, and the second call signal portion is established as call information portion T2. From the a priori knowledge that a call information portion T2 is followed by a call information portion T3, the state machine transitions to state 506. During the transition between state 304 and state 306 (at step 314), the detection criterion value for each of the unique call information portions is adjusted as follows: T1_BET is set to 9, T2_BET is set to 9 and T3_BET is set to 14. In this example 200, T1_BET and T2_BET are lowered while T3_BET is increased to maximize the probability with which call signal portion T3 is received.

In state 306, a third call signal portion is extracted from the call signal and compared to each of the unique call information portions: T1, T2 and T3. The number of errors CSP1_BE, CSP2_BE and CSP3_BE are derived by comparing the third call signal portion to T1, T2 and T3, respectively. CSP1_BE, CSP2_BE and CSP3_BE are then compared to the detection criterion value: T1_BET, T2_BET and T3_BET, respectively.

In the first example 200, while in state 306, CSP3_BE is less than T3_BET, and the third call signal portion is established as call information portion T3. Since call information portion T3 is the last expected burst in the call information portion sequence, the state machine 300 transitions to state 308 (at step 316). During the transition between state 306 and state 308 (at step 316), the detection criterion value for each of the unique call information portions is adjusted as follows to maximize the probability of detecting the end of a call signal: T1_BET is set to 9, T2_BET is set to 9 and T3_BET is set to 9. Once the state machine reaches state 308, it begins to process the call signal. Once an End of Call signal is received (at step 318), the state machine 300 returns to its initial state 302 and the detection criterion value for all the call information portions in the sequence is reassigned to their initial values.

Let us now describe a second example 202 in which call information portion T2 is not established. In the second example 202, as noted above in the first example, when a call signal is received in the initial state 302 (at step 310), a first call signal portion is extracted and compared to each of the unique call information portions: T1, T2 and T3. The number of errors CSPI_BE, CSP2_BE and CSP3_BE are derived by comparing the first call signal portion to T1, T2 and T3, respectively. CSP1_BE, CSP2_BE and CSP3_BE are then compared to the detection criterion value, in this example, the bit error threshold: T1_BET, T2_BET and T3_BET, respectively.

In this second example 202, CSP1_BE is less than or equal to T1_BET, and the first call signal portion is established as call information portion T1. From a priori knowledge of the call information sequence that a T1 call information portion is followed by a T3 call information portion, the state machine 300 transitions to state 304 (at step 312). The detection criterion value for each unique call information portion is adjusted, if necessary. In this example, T1_BET is set to 11, T2_BET is set to 11 and T3_BET is set to 11 to increase the reliability with which the T3 call signal portion is received.

In state 304, CSP3_BE is less than T3_BET, and the second call signal portion is established to be T3. Since this is the last expected burst in the sequence, the state machine 300 transitions to 308 (at step 320). During the transition between state 304 and state 308 (at step 320), the detection criterion value for each of the unique call information portions is adjusted as follows to maximize the probability of detecting the end of a call signal: T1_BET is set to 9 , T2_BET is set to 9 and T3_BET is set to 9. Once the state machine reaches state 308, it begins to process the call signal. Once an End of Call signal is received (at step 318), the state machine 300 returns to its initial state 302 and the detection criterion value for all the call information portions in the sequence is re-assigned to their initial values.

Let us now refer to yet a third example 204 in view of the above general assumptions In the third example 204, when a call signal is received in the initial state 302 (at step 310), a first call signal portion is extracted and compared to each of the unique call information portions, the number of errors CSP1_BE, CSP2_BE and CSP3_BE are derived, and CSP1_BE, CSP2_BE and CSP3_BE are compared to the detection criterion value T1_BET, T2_BET and T3_BET, respectively.

In this third example 204, CSP2_BE is less than or equal to T2_BET when the state machine is in its initial state 302, and the first call signal portion is established as call information portion T2. From a priori knowledge that a T2 call information portion is followed by a T3 call information portion, the state machine 300 transitions from its initial state 302 to state 306 (at step 322). Since only call information portion T3 is expected, the detection criterion value for each unique call information portion in this third example is adjusted as follows: T1_BET is set to 9, T2_BET is set to 9 and T3_BET is set to 14 to increase the reliability with which the T3 call signal portion is received.

In state 306, CSP3_BE is less than T3_BET, and the second call signal portion is established to be T3. Since this is the last expected burst in the sequence, the state machine 300 transitions to state 308. The state machine 300 adjusts the detection criterion value and processes the call signal as described in the first and second examples 200, 202.

In yet a fourth example 206 in view of the above general assumptions, when a call signal is received in the initial state 302 (at step 310), CSP3_BE is less than T3_BET, and the call signal portion is established to be T3. Since this is the last expected burst in the sequence, the state machine transitions to state 308. The state machine 300 adjusts the detection criterion value and processes the call signal as described in the first and second examples.

In a fifth and final example 208 in view of the above general assumptions, when a call signal is received in the initial state 302 (at step 310), if none of the detection criterion value are successfully matched when the first call signal portion is compared to the thresholds of each unique call information portion, the state machine 300 discards the call signal, remains in its initial state 302, and maintains the thresholds at their default/initial values.

It should be noted that if the state machine 300 transitions into a particular state as a result of establishing a specific call information portion, the state machine 300 will remain in the same state until the next call information portion that is higher in the a priori call information sequence is established. For example, if the state machine 300 established call information portion T1 in state 302, it transitions to state 304. If the state machine establishes call information portion T1 again while in state 304, it will remain in state 304 until a call signal portion matches call information portion T2 or T3.

It should also be noted that if none of the detection criterion value are successfully matched at a given state, the state machine 300 discards the call signal, transitions back to initial state 302 and the detection criterion value are reset to the default values by modifying T1_BET to 9, T2_BET to 9, and T3_BET to 9. This decreases the probability of declaring a call signal portion as a call information portion incorrectly.

Further advantages and modifications of the present disclosure will readily occur to those skilled in the art. The disclosure, in its broader aspects, is therefore not limited to the specific details, representative system and methods, and illustrative examples shown and described above. Various modifications and variations can be made to the above specification without departing from the scope or spirit of the present disclosure, and it is intended that the present disclosure cover all such modifications and variations provided they come within the scope of the following claims and their equivalents. For example, in Motorola X2 TDMA systems, multiple TDMA bursts containing synchronization are transmitted at the start of a call. If the receiving device does not detect the initial TDMA bursts with synchronization while in its initial state, 360 ms of voice information is lost, and voice information continues to be truncated until a voice synchronization signal is detected.

What is claimed is:

1. A method for receiving a call signal at a receiving device in a communication system comprising:
   extracting a first call signal portion from the call signal;
   comparing the first call signal portion to a plurality of call information portions, wherein each call information portion has a detection criterion value;
   if the first call signal portion matches one of the call information portions:
      adjusting the detection criterion value for at least one of the plurality of call information portions;
      extracting a second call signal portion from the call signal; and
      comparing the second call signal portion to the plurality of call information portions,
   wherein the plurality of call information portions have an a priori call information sequence, and further comprising continuing to extract a next call signal portion from the call signal, compare the next call signal portion to the plurality of call information portions, and if the next call signal portion matches a given call information portion, adjust the detection criterion for at least one of the plurality of call information portions, until one of the call signal portions matches a last call information portion in the a priori call information sequence.

2. The method of claim 1 further comprising, if the first call signal portion does not match any of the plurality of call information portions, discarding the call signal.

3. The method of claim 1 wherein the detection criterion value is a bit error threshold.

4. The method of claim 3 wherein the step of adjusting the detection criterion value for at least one of the plurality of call in formation portions comprises increasing the bit error threshold.

5. The method of claim 3 wherein the step of adjusting the detection criterion value for at least one of the plurality of call in formation portions comprises decreasing the bit error threshold.

6. The method of claim 1 wherein the detection criterion value is a correlation threshold.

7. The method of claim 1 wherein the call signal is a time division multiple access signal.

8. The method of claim 1 wherein the plurality of call information portions have an a priori call information sequence, and further comprising the step of processing the call signal after one of the call signal portions matches a last call information portion in the a priori call information sequence.

9. The method of claim 8 further comprising the steps of:
   receiving an end of call signal;
   ceasing processing the call signal; and
   resetting the detection criterion value for the plurality of call information portions to their initial values.

10. The method of claim 1 wherein the first detection criterion value is higher than the second detection criterion value.

11. The method of claim 1 further comprising, if the second call signal portion does not match any of the plurality of call information portions, discarding the call signal.

12. A method for receiving a call signal at a receiving device in a communication system comprising:
   operating in a first state prior to detecting the call signal, wherein, upon detection of the call signal, a first call signal portion from the call signal is extracted, and the first call signal portion is compared to a plurality of call information portions, wherein each call information portion has a first detection criterion value;
   if the first call signal portion matches one of the call information portions, operating in a second state, wherein at least one the first detection criterion value for at least one of the plurality of call information portions is adjusted to a second detection criterion value, a second call signal portion from the call signal is extracted, and the second call signal portion is compared to the plurality of call information portions,
   wherein the plurality of call information portions have an a priori call information sequence, and further comprising continuing to extract a next call signal portion from the call signal, compare the next call signal portion to the plurality of call information portions, and if the next call signal portion matches a given call information portion, adjust the detection criterion value for at least one of the plurality of call information portions, until one of the call signal portions matches a last call information portion in the a priori call information sequence.

13. The method of claim 12 wherein the first detection criterion value is higher than the second detection criterion value.

14. The method of claim 12 further comprising, if the first call signal portion does not match any of the plurality of call information portions, discarding the call signal.

15. The method of claim 12 further comprising, if the second call signal portion does not match any of the plurality of call information portions, discarding the call signal.

16. The method of claim 12 wherein the detection criterion value is one of a bit error threshold, or a correlation threshold.

17. The method of claim 12 wherein the plurality of call information portions have an a priori call information sequence, and further comprising the step of processing the call signal after one of the call signal portions matches a last call information portion in the a priori call information sequence.

18. The method of claim 17 further comprising the steps of:
   receiving an end of call signal;
   ceasing processing the call signal; and
   resetting the detection criterion values for each of the plurality of call information portions to their initial values.

* * * * *

UNITED STATES PATENT AND TRADEMARK OFFICE
CERTIFICATE OF CORRECTION

PATENT NO.         : 7,848,363 B2
APPLICATION NO.    : 12/121111
DATED              : December 7, 2010
INVENTOR(S)        : Natarahjan et al.

Page 1 of 1

It is certified that error appears in the above-identified patent and that said Letters Patent is hereby corrected as shown below:

IN THE SPECIFICATION

In Column 4, Line 3, delete "described" and insert -- described. --, therefor.

IN THE CLAIMS

In Column 7, Line 52, in Claim 4, delete "in formation" and insert -- information --, therefor.

In Column 7, Line 56, in Claim 5, delete "in formation" and insert -- information --, therefor.

In Column 8, Line 25, in Claim 12, delete "one the" and insert -- one of the --, therefor.

Signed and Sealed this
Fifth Day of June, 2012

David J. Kappos
*Director of the United States Patent and Trademark Office*